UNITED STATES PATENT OFFICE.

JOSEPH A. SHINN, OF GREENVILLE, PENNSYLVANIA; MARY E. SHINN ADMINISTRATRIX OF SAID JOSEPH A. SHINN, DECEASED; EDMUND W. SHINN AND MARY ELLEN SHINN ADMINISTRATORS OF SAID MARY E. SHINN, DECEASED.

CEMENT.

1,334,272.            Specification of Letters Patent.       Patented Mar. 16, 1920.

No Drawing.        Application filed January 9, 1919. Serial No. 270,402.

*To all whom it may concern:*

Be it known that I, JOSEPH A. SHINN, a citizen of the United States, residing at Greenville, in the county of Mercer and State of Pennsylvania, have invented a new and useful Improvement in Cements, of which the following is a full, clear, and exact description.

This invention relates to an improvement in cements, and is designed to provide a cement having the general characteristics of Portland cement, but which will have a greater tensile and compression strength, which will harden in a shorter period of time and which is cheaper than the Portland cement of today.

In making my cement I take 40 to 60 parts by weight of granulated slag sand, such as made in accordance with my Patent No. 707,170, or slag of a similar character, which has been ground in any suitable mill to a fineness equal to the fineness of regular Portland cement, and mix with this granulated slag sand 60 to 40 parts by weight any of the well known Portland cements on the market today, together with 10 to 30 parts by weight of ground lime hydrate. The mixture is thoroughly mixed in a tube mill or any suitable mechanical mixer and is afterward mixed in the same manner as Portland cement of today in the aggregate, composed of sand and cement or sand, gravel and cement.

I have also discovered that a mixture of granulated slag sand and Portland cement without the admixture of lime hydrate will produce an excellent cement which can be used as above described, and the broad claims are intended to cover a cement of this character.

I prefer to grind the slag sand, the cement clinker and the lime hydrate separately and mix the parts after they have been ground, but it will be readily appreciated by those familiar with the art that the three ingredients may be ground together, and that the proportions may be varied from those specified.

The advantages of my invention result from the provision of a hydraulic cement which can be cheaply manufactured, and which has a very high tensile and compression strength.

I claim:

1. A hydraulic cement comprising Portland cement, and ground slag sand, thoroughly mixed.

2. A cement comprising Portland cement, ground lime hydrate and ground slag sand thoroughly mixed.

3. A cement comprising 40 to 60 parts by weight of Portland cement and 60 to 40 parts of ground slag sand thoroughly mixed.

4. A cement comprising 40 to 60 parts by weight of Portland cement, 60 to 40 parts of ground slag sand, and 10 to 30 parts of ground lime hydrate thoroughly mixed.

5. An aggregate comprising sand, gravel, and cement comprising Portland cement, ground lime hydrate, and ground slag sand.

6. An aggregate composed of sand, gravel and a cement consisting of 40 to 60 parts by weight of Portland cement, 60 to 40 parts of ground slag sand, and 10 to 30 parts of ground lime hydrate thoroughly mixed.

In testimony whereof, I have hereunto set my hand.

JOSEPH A. SHINN.